United States Patent [19]
Davis et al.

[11] Patent Number: 5,302,466
[45] Date of Patent: Apr. 12, 1994

[54] EXPANDED METAL STRIP FOR REINFORCING A RESILIENT PRODUCT

[75] Inventors: Robert W. Davis, Xenia; Thomas H. Harney, Beavercreek, both of Ohio

[73] Assignee: The Gem City Engineering Co., Dayton, Ohio

[21] Appl. No.: 16,792

[22] Filed: Feb. 11, 1993

Related U.S. Application Data

[63] Continuation-in-part of Ser. No. 754,942, Sep. 4, 1991, Pat. No. 5,199,142.

[51] Int. Cl.⁵ .......................... E06B 7/22; E06B 7/232
[52] U.S. Cl. .................................. 428/573; 428/575; 428/595; 428/596; 428/600; 49/490.1
[58] Field of Search ............... 428/573, 574, 575, 596, 428/595, 600, 603, 122; 49/475.1, 490.1

[56] References Cited

U.S. PATENT DOCUMENTS

| | | | |
|---|---|---|---|
| 1,267,978 | 5/1918 | Collinson | 29/6.1 |
| 2,290,842 | 7/1942 | Bush | 428/596 |
| 3,256,577 | 6/1966 | Bright | 49/490.1 |
| 4,099,765 | 7/1978 | Bright | 49/490.1 |
| 4,188,424 | 2/1980 | Ohno et al. | 49/490.1 |
| 4,304,816 | 12/1981 | Bright et al. | 49/490.1 |
| 4,305,187 | 12/1981 | Iwamura et al. | 29/6.1 |
| 4,348,443 | 9/1982 | Hein | 428/122 |
| 4,430,374 | 2/1984 | Ezaki | 428/122 |
| 4,610,907 | 9/1986 | Elvira | 428/122 |
| 4,749,203 | 6/1988 | Bright | 428/122 |
| 4,921,118 | 5/1990 | Gass | 29/6.1 |

FOREIGN PATENT DOCUMENTS

| | | | |
|---|---|---|---|
| 252659 | 1/1988 | European Pat. Off. | 428/122 |
| 58-76343 | 5/1983 | Japan | 428/122 |
| 60-156766 | 1/1987 | Japan | |
| 2067105 | 7/1981 | United Kingdom | |
| 4110467 | 6/1992 | United Kingdom | |

*Primary Examiner*—John Zimmerman
*Attorney, Agent, or Firm*—Jacox & Meckstroth

[57] ABSTRACT

A continuous strip of sheet metal is progressively sheared with longitudinally spaced and laterally extending slits to form opposing U-shaped tabs having corresponding edge portions and successively connected by corresponding center portions of the strip. In one embodiment, the sheared strip is fed between first and second overlapping sets of power driven pinch rollers which progressively grip the edge and center portions, respectively, and the second set of pinch wheels is longitudinally offset and driven at a higher peripheral speed to produce precisely uniform expansion of the strip by deforming the U-shaped tabs into V-shaped tabs. A hot melt adhesively impregnated flexible filament is progressively attached to the expanded center portions of the strip while the strip is heated to form a continuous center connection. In another embodiment, the strip of opposing U-shaped tabs is expanded into opposing V-shaped tabs by coining or thinning a connecting center portion of the strip. The expanded strip is progressively formed into a channel which is fed into an extrusion head for reinforcing a rubber-like weather-strip.

3 Claims, 2 Drawing Sheets

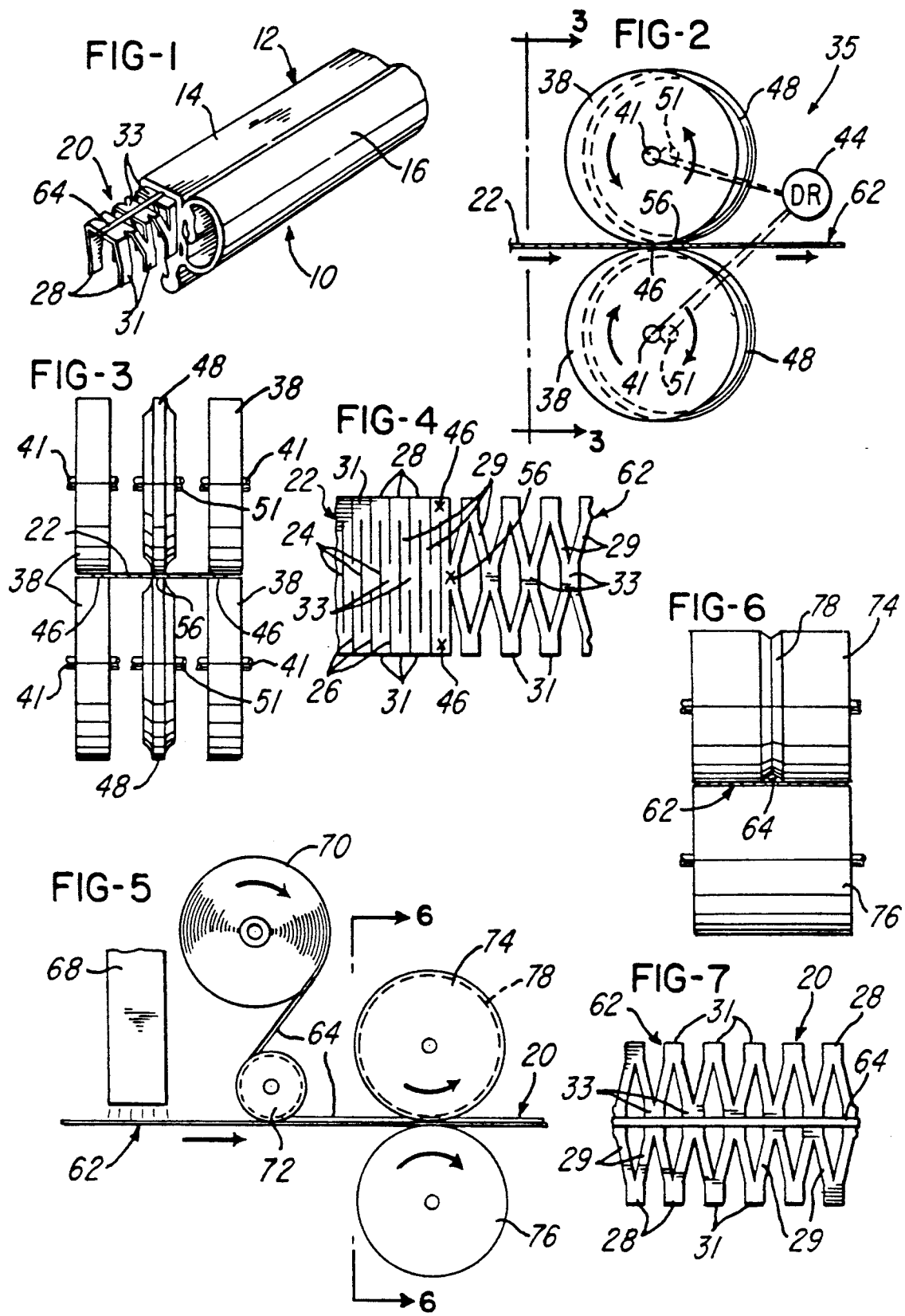

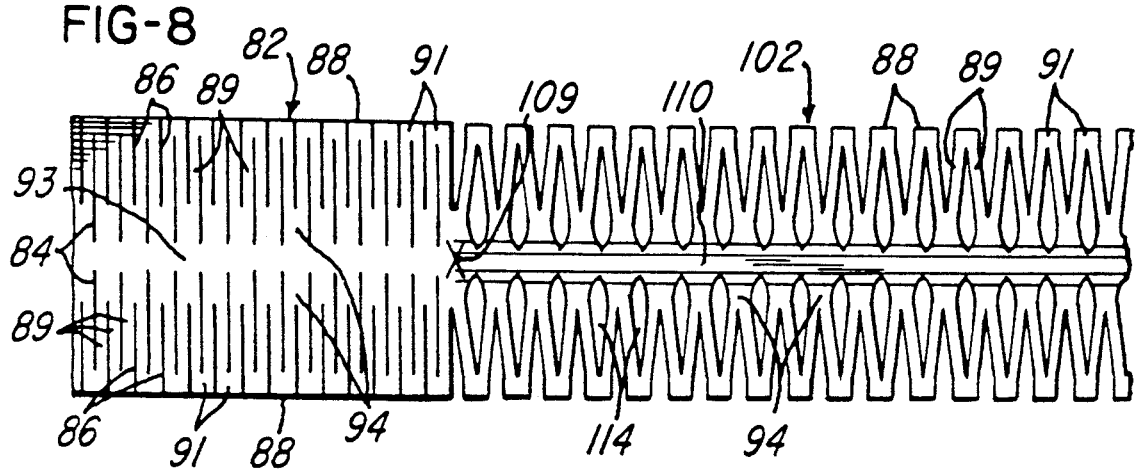
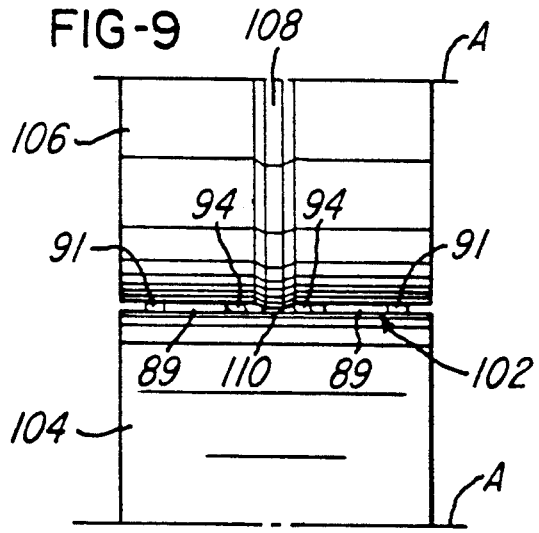

EXPANDED METAL STRIP FOR REINFORCING A RESILIENT PRODUCT

RELATED APPLICATIONS

This application is a continuation-in-part of application Ser. No. 754,942, filed Sep. 4, 1991, now U.S. Pat. No. 5,199,142.

BACKGROUND OF THE INVENTION

In the production of rubber or rubber-like weatherstrips of the type commonly used on motor vehicles around the doors, windows and trunk covers, it is common to reinforce each weatherstrip with a formed metal element which is continuously fed through an extruder head having a die for forming the weatherstrip with the desired cross-sectional configuration. One type of continuous reinforcing strip which has been used is in the form of a serpentine-shaped continuous wire to which is stitched longitudinally extending thread-like filaments.

Another form of metal reinforcing strip is disclosed in U.S. Pat. No. 2,290,842 wherein a flat strip of sheet metal is fed between a pair of driven cutting and forming rolls 26 and 27 (FIG. 5) which slit the strip, as shown in FIGS. 2 or 7. The slit strip is then fed around a higher speed drum 39 against which the strip is held by a pressure roll 40. The higher peripheral speed of the drum 39 is used to stretch the slit strip to an expanded strip, as shown in FIGS. 3 and 8. The edge portions of the expanded strip are then rolled around longitudinally extending wires 3, which limit further stretching of the strip. The strip is bent along the fold lines 10 and 11 to form either of the channel-shaped expanded metal reinforcing strips shown in FIGS. 1 and 6.

Other forms of expanded metal reinforcing strips are produced by slitting a metal strip with laterally extending slits and then coining or thinning a longitudinally extending portion or portions of the strip. This method is used to form a ladder-like expanded metal strip, such as disclosed in British Patent Application No. 2,067,105 or Japanese Patent Application No. 60-156766, or a fishbone-type expanded metal strip. In the latter strip, parallel spaced pics or wings project laterally outwardly from opposite sides of a center spline portion which is coined or reduced in thickness to produce the space between the wings.

It has been determined that the cutting and expanding apparatus disclosed in FIG. 5 of U.S. Pat. No. 2,290,842 does not produce uniform and precision expansion of the cut sheet metal strip. It has also been found undesirable to feed a non-uniformly expanded strip into an extrusion head, and a rubber-like weatherstrip with a non-uniform reinforcing insert is undesirable. Furthermore, the operation of attaching the wires 3 is relatively slow and expensive. Problems are also encountered with the fishbone-type expanded strip in that the laterally projecting and longitudinally spaced wings are easily bent in a longitudinal direction when the strip is being fed through a rubber extruder head. This results in an undesirable or unacceptable weatherstrip product which is not uniformally reinforced along its length.

SUMMARY OF THE INVENTION

The present invention is directed to the production of an improved expanded metal strip for reinforcing a rubber-like product and, in accordance with one embodiment, of the general type disclosed in the above mentioned U.S. Pat. No. 2,290,842. As one important feature, an expanded metal strip is produced in accordance with the present invention by high speed progressive expansion of a cut or sheared metal strip in a manner which forms a continuous expanded metal strip with precision and uniform spacing between the successive expanded portions of the strip. In addition, the present invention provides for a uniformally expanded metal strip having a longitudinally extending coined portion or a continuous non-stretchable element for connecting the center portions of the strip. The filament or integrally connecting center portion prevents further expansion or extension of the strip while it is being handled and fed through an extrusion head and also prevents stretching or extension of the extruded rubber-like weatherstrip body when the body is curved during installation on a motor vehicle.

In accordance with one embodiment of the invention, the above features and advantages are obtained by feeding a cut or slit sheet metal strip between two sets of driven pinch rollers. The first set of pinch rollers grips opposite edge portions of the strip, and the second set of pinch rollers grips center portions of the strip slightly downstream of the first set of rollers. The second set of rollers is driven at a substantially higher peripheral speed in order to obtain high speed and uniform expansion of the strip. A flexible string-like filament impregnated with a hot melt adhesive is fed into contact with expanded portions of the metal strip after the strip is heated, and the expanded strip and attached filament are fed between pressure rollers which cool the strip and adhesive for positively securing the filament to the expanded center portions of the strip.

In another embodiment of the invention, the center portion of the sheet metal strip is not cut or slit laterally and is fed between a set of coining rolls. The rolls coin or thin the center portion of the strip and thereby expand the opposing U-shape tabs into opposing V-shaped tabs which define tapered openings or slots on opposite sides of the coined center portion. The V-shaped tabs cooperate with the integrally connecting center portion to provide another form of non-stretchable but flexible reinforcing strip which is ideally suited for feeding through an extruder head and for producing a corresponding non-stretchable but flexible reinforced weatherstrip.

Other features and advantages of the invention will be apparent from the following description, the accompanying drawing and the appended claims.

BRIEF DESCRIPTION OF THE DRAWING

FIG. 1 is a fragmentary perspective view of a weatherstrip reinforced by an expanded metal insert strip constructed in accordance with the invention;

FIG. 2 is a diagrammatic elevational view of the sets of pinch rollers which expand a cut or slit sheet metal strip in accordance with the invention;

FIG. 3 is a diagrammatic view of the pinch rollers, as taken generally on the line 3—3 of FIG. 2;

FIG. 4 is a fragmentary section of the cut metal strip as it is being expanded by the sets of pinch rollers shown on FIGS. 2 and 3;

FIG. 5 is a diagrammatic elevational view of apparatus for attaching and securing a flexible string-like filament to the expanded metal strip;

FIG. 6 is a section taken generally on the line 6—6 of FIG. 5;

FIG. 7 is a fragmentary section of an expanded metal strip and attached filament produced in accordance with the invention and prior to being bent to form a channel for feeding into an extrusion head to produce the reinforced weatherstrip shown in FIG. 1;

FIG. 8 is a fragmentary section of a cut or lanced metal strip and being expanded in accordance with another embodiment of the invention; and FIG. 9 is a fragmentary elevational view of a set of coining rolls which are used to expand the metal strip shown in FIG. 8.

DESCRIPTION OF THE PREFERRED EMBODIMENTS

FIG. 1 illustrates a typical reinforced weatherstrip 10 having an extruded rubber or rubber-like body 12 formed by a channel shaped portion 14 and a resilient and flexible bulbous or tubular portion 16. If desired, the body 12 may be extruded with a dual durometer with the channel portion 14 having a higher durometer than the resilient tubular portion 16.

In accordance with the present invention, the body 12 is reinforced with a continuous and longitudinally extending expanded sheet metal reinforcing strip 20 which is fed into the extruder head to form a reinforcing insert within the channel portion 14 of the rubber-like body 12. As shown in FIG. 4, the expanded metal strip 20 is produced by first cutting or shearing a strip 22 of thin sheet metal with longitudinally spaced and laterally extending slits 24 and 26. The slits define opposing pairs of U-shaped tabs 28 each having parallel leg portions 29 integrally connected by a corresponding edge portion 31. The leg portions 29 of adjacent tabs 28 are integrally connected by corresponding center portions 33.

After the strip 22 is sheared or cut with the slits 24 and 26, the strip may be coiled for transport and/or storage or immediately fed into an expanding mechanism 35, as diagrammatically shown in FIGS. 2 and 3. The mechanism 35 includes a set of two pairs of opposing pinch wheels or rollers 38 which are supported by corresponding shafts 41 with each pair of rollers 38 in opposing relation. The rollers 38 are all driven at a selected common speed by a variable speed motor drive unit 44, and the rollers 38 are positioned to engage the edge portions 31 of each pair of opposing tabs 28. The corresponding nips of each pair of rollers 38 grip the edge portions of the strip 22 along corresponding lines which pass through spots 46.

The expanding mechanism 35 also includes a pair of opposing gripping wheels or rollers 48 which are supported between the two pairs of rollers 38 by corresponding shafts 51. The rollers 48 are also driven by the drive unit 44, but at a substantially higher speed, approximately twice the speed of the rollers 38. Preferably, the rollers 38 and 48 are driven through corresponding thin spur gears (not shown). As shown in FIG. 2, the rollers 48 are positioned slightly downstream of the rollers 38 and form a nip 56 (FIG. 2) which successively engages the center portions 33 of the strip 22. As shown the rollers are driven through a gear drive train (not shown). As shown in FIG. 2, the rollers 48 are positioned slightly downstream of the rollers 38 and form a nip 56 which successively engages the center portions 33 of the strip 22 along a line which passes through a point 56. As shown in FIG. 4, the nip 56 formed by the rollers 48 is downstream from the nips 46 formed by the rollers 38 by a distance equal to the width of a leg portion 29 or corresponding generally to the width of the tabs 28.

As the cut or sheared strip 22 is fed into the nips formed by the rollers 38 and 48, the strip is precisely and uniformly expanded into an expanded strip 62 (FIG. 4). The corresponding edge portions 31 and the center portions 33 are spaced longitudinally by a uniform distance, and the U-shaped tabs 28 with parallel leg portions 29 are deformed into V-shaped tabs 28 with diverging leg portions 29. The leg portions 29 of each tab 28 are integrally connected by a corresponding edge portion 31, and the adjacent leg portions 29 of adjacent tabs 28 are integrally connected by a center portion 33.

Referring to FIGS. 5-7, the expanded metal strip 62 may be wound into a coil for storage or transport or may be fed directly into forming rollers which bend the strip 62 into a U-shaped reinforcing channel similar to the strip 20 shown in FIG. 1. However, preferably the expanded metal strip 62 receives a flexible and non-stretchable string-like element 64. The flexible element 64 includes fiberglass filaments which are impregnated with a heat sensitive or hot melt adhesive. However, the flexible element 64 may also be formed of other non-stretchable materials such as a filament tape bonded to the strip 62 with suitable pressure sensitive adhesive.

As shown in FIG. 5, the expanded metal strip 62 is heated by a hot air blower 68, and the heated strip 62 is fed into contact with the flexible line or filament 64 impregnated with hot melt adhesive and supplied from a spool 70. The filament or element 64 is fed around a guide roller or wheel 72 into contact with the heated strip 62, and the assembly is fed between a pair of pinch rollers 74 and 76. The rollers 74 and 76 press the filament 64 into firm contact with the expanded strip 62 and also help cool or dissipate heat from the expanded metal strip 62 to form the expanded sheet metal insert strip 20. The roller 74 has a circumferentially extending groove 78 which locates the filament 64 relative to the expanded strip 62 during the bonding operation. The bonded filament 64 maintains the uniform expansion of the strip 62 and prevents further expansion or extension of the strip after it is inserted into the rubber-like weatherstrip body 12. The bonding of the rubber-like material to the expanded metal strip 62 and filament 64 also prevents extension and tearing of the weatherstrip body 12.

Referring to FIGS. 8 and 9 which show another embodiment of the invention, a sheet metal reinforcing strip 82 has a uniform thickness, for example, on the order of 0.020 inch, and is progressively lanced or cut to form longitudinally spaced parallel slits 84 and 86. The slits 84 do not extend laterally across the center portion of the strip, as do the slits 24 described above in connection with FIG. 4, but are interrupted to define a longitudinally extending center portion 93. The slits 84 and 86 define opposing U-shaped tabs 88 each having an outer edge portion 91 integrally connecting a pair of parallel leg portions 89. The adjacent leg portions 89 of each pair of adjacent tabs 88 are integrally connected by a corresponding outer center portion 94, and all of the center portions 94 are integrally connected by the inner center portion 93.

The slit sheet metal strip 82 is formed into an expanded sheet metal strip 102 (FIG. 8) by directing the strip 82 between a set of coining rolls 104 and 106 (FIG. 9) each of which is driven and supported for rotation on its corresponding axis A. The roll 106 includes an outwardly projecting circumferential rib 108 which compresses the strip 82 at the nip 109 (FIG. 8) for coining the strip to reduce the thickness of the center portion 93 to a thinner center portion 110 having a thickness, for example, on the order of 0.012 to 0.015 inch. The coining of the center portion 93 to the thinner center portion 110 is effective to expand the strip 82 longitudinally to form the expanded strip 102. The expansion also forms the V-shaped tabs 88 with diverging leg portions 89 which define longitudinally spaced teardrop-shaped or diamond openings 114. The V-shaped leg portions 89 of the longitudinally spaced tabs 88 remain integrally connected by the outer edge portions 91, and the leg portions 89 of adjacent tabs 88 remain integrally connected by the longitudinally spaced center portions 94.

From the drawing and the above description, it is apparent that an expanded metal reinforcing strip constructed in accordance with the present invention, provides desirable features and advantages. As one primary advantage, the expansion of the cut or slit strip 22 into the expanded strip 62 by the pinch roller mechanism 35 or the expansion of slit strip 82 into the strip 102 by the coining rolls 104 and 106 provides for high speed production of the strip and assures that the strip is uniformly and precisely expanded. As another feature, the adhesive bonding or attachment of the flexible filament 64 to the center portions 33 of the expanded metal strip 62 or the integral connection of the center portions 94 by the thinner center portion 93 is effective to prevent further expansion of the expanded strip 62 and stretching or elongation of the weatherstrip body as the weatherstrip is being produced and cured or while the weatherstrip is being installed on a motor vehicle or after extended use of the weatherstrip on the vehicle. In addition, the V-shaped tabs 28 or 88 provide the strip with greater strength to prevent the tabs from bending in a longitudinal direction due to the pressure of the rubber material while feeding the expanded strip in its channel configuration through an extruder head. The openings 114 further provide for better adhesion of the rubber to the expanded strip 102 and for more uniform coverage of the expanded strip by the rubber material. The expanded strip 102 may also be broken between each pair of opposing slots 114 without disconnecting the tabs 88. This breaking operation may be performed after the weatherstrip is formed and cured in order to provide for compressing the weatherstrip around a corner when the adjacent broken sections of the center portion 110 overlap slightly.

While the expanded metal reinforcing strips and the methods and apparatus herein described for producing the strips constitute preferred embodiments of the invention, it is to be understood that the invention is not limited to the precise articles, methods and apparatus disclosed, and that changes may be made therein without departing from the scope and spirit of the invention as defined in the appended claims.

The invention having thus been described, the following is claimed:

1. An expanded elongated metal strip adapted for reinforcing a resilient weatherstrip product, comprising a continuous series of longitudinally spaced opposing V-shaped tabs each having a pair of diverging leg portions, said leg portions of said tabs being integrally connected by corresponding longitudinally spaced separate marginal edge portions of said strip, the adjacent said leg portions of adjacent said tabs being integrally connected by a longitudinally extending center portion of said strip, and said center portion of said strip having a thickness substantially less than the thickness of said tabs.

2. An expanded elongated metal strip adapted for reinforcing a resilient weatherstrip product, comprising a continuous series of longitudinally spaced opposing V-shaped tabs each having a pair of diverging leg portions, said leg portions of said tabs being integrally connected by corresponding longitudinally spaced separate marginal edge portions of said strip, the adjacent said leg portions of adjacent said tabs being integrally connected by longitudinally spaced separate corresponding connecting portions of said strip, all of said separate corresponding connecting portions of said strip being integrally connected by a longitudinally extending center portion of said strip, and said center portion of said strip having a thickness substantially less than the thickness of said tabs.

3. An expanded elongated metal strip adapted for reinforcing a resilient weatherstrip product, comprising a continuous series of longitudinally spaced opposing V-shaped tabs each having a pair of diverging leg portions, said leg portions of said tabs being integrally connected by corresponding longitudinally spaced separate marginal edge portions of said strip, the adjacent said leg portions of adjacent said tabs being integrally connected by a longitudinally extending center portion of said strip, said center portion of said strip having a thickness substantially less than the thickness of said tabs, and said V-shaped tabs cooperate with said longitudinally extending center portion of said strip to define longitudinally spaced pairs of opposing V-shaped tapered openings within said strip.

* * * * *